United States Patent [19]

Taylor et al.

[11] Patent Number: 4,793,685
[45] Date of Patent: Dec. 27, 1988

[54] OPTICAL CABLE WITH NONMETALLIC REINFORCING ELEMENTS

[75] Inventors: John E. Taylor, Maidenhead; Christopher J. White, Billericay; Jonathan E. Nevett, London, all of England

[73] Assignee: BICC plc, London, England

[21] Appl. No.: 125

[22] Filed: Jan. 2, 1987

[30] Foreign Application Priority Data

Jan. 7, 1986 [GB] United Kingdom ............... 8600294

[51] Int. Cl.⁴ .......................... G02B 5/14; G02B 5/16
[52] U.S. Cl. .................................................. 350/96.23
[58] Field of Search ................................... 350/96.23

[56] References Cited

U.S. PATENT DOCUMENTS

| 4,354,732 | 10/1982 | Arnaud, deceased et al. | 350/96.23 |
| 4,361,381 | 11/1982 | Williams | 350/96.23 |
| 4,422,889 | 12/1983 | Trezeguet et al. | 350/96.23 |
| 4,435,238 | 3/1984 | Smith | 350/96.23 |

FOREIGN PATENT DOCUMENTS

| 1131953 | 9/1982 | Canada . |
| 1486764 | 9/1977 | United Kingdom . |
| 2023060 | 12/1979 | United Kingdom . |
| 2027084 | 2/1980 | United Kingdom . |
| 2085188 | 4/1982 | United Kingdom . |
| 2101798 | 1/1983 | United Kingdom . |
| 2157848 | 10/1985 | United Kingdom . |
| 2166171 | 4/1986 | United Kingdom . |
| 2174822 | 11/1986 | United Kingdom . |

Primary Examiner—Stanley D. Miller
Assistant Examiner—Richard Roseen
Attorney, Agent, or Firm—Parkhurst, Oliff & Berridge

[57] ABSTRACT

An elongate flexible core 1 especially suitable for use in an optical cable to be employed as an aerial cable has in its outer circumferential surface circumferentially spaced, longitudinally extending grooves 3 in which optical fibres 34 will be loosely housed and comprises extruded plastics material and a multiplicity of longitudinally stressed elongate flexible non-metallic reinforcing element each substantially encapsulated in the extruded plastics material, the multiplicity of non-metallic reinforcing elements being substantially evenly distributed throughout the cross-sectional area of the core. The non-metallic reinforcing elements preferably extend helically around the axis of the core a long length of lay and preferably constitute 60 to 70% by volume of the extruded plastics material. The non-metallic reinforcing elements are preferably made of an aromatic polyamide and the plastics material may be a thermoplastics material, a thermosetting material or a thermotropic liquid crystalline polymer. The core 1 may be a single elongate flexible body or it may comprise a plurality of elongate flexible bodies extending helically around the axis of the core.

13 Claims, 1 Drawing Sheet

OPTICAL CABLE WITH NONMETALLIC REINFORCING ELEMENTS

This invention relates to optical cables for the transmission of the ultra-violet, visible and infra-red regions of the electromagnetic spectrum, which regions, for convenience, will hereinafter all be included in the generic term "light" and especially, but not exclusively, to optical cables for use in the communications field adapted for transmission of light having a wavelength within the range 0.8 to 2.1 micrometers.

The invention is particularly concerned with an optical cable of the kind comprising an elongate flexible core having in its outer circumferential surface a plurality of circumferentially spaced, longitudinally extending separate grooves, e.g. helically extending grooves, in at least one of which is loosely housed at least one separate optical fibre and/or at least one optical bundle as hereinafter defined.

By the expression "optical bundle" is meant a group of optical fibres or a group of fibres including one or more optical fibres and one or more non-optical reinforcing fibres or other reinforcing elongate elements.

It is an object of the present invention to provide an improved elongate flexible core for use in an optical cable of the aforesaid kind, by means of which the optical cable is rendered especially, but not exclusively, suitable for use as an aerial optical cable.

According to the invention, we provide an improved elongate flexible core having in its outer circumferential surface a plurality of circumferentially spaced, longitudinally extending separate grooves, e.g. grooves extending helically around the core, wherein the core comprises extruded plastics material and a multiplicity of longitudinally stressed elongate flexible non-metallic reinforcing elements each substantially encapsulated in said extruded plastics material. The multiplicity of non-metallic reinforcing elements is substantially evenly distributed throughout the cross-sectional area of the core.

The elongate flexible core may be a single elongate body or, where a high degree of flexibility is required, it may and comprise a plurality of elongate flexible bodies extending helically around the axis of the core, each of which bodies comprises extruded plastics material and a multiplicity of longitudinally stressed elongate flexible non-metallic reinforcing elements each substantially encapsulated in said extruded plastics material. The multiplilcity of non-metallic reinforcing elements is substantially envely distributed throughout the cross-sectional area of the body.

Preferably, at any position along the length of the elongate flexible core the proportion of non-metallic reinforcing elements in the or each extruded plastics body lies in the range 60 to 70% by volume.

The non-metallic reinforcing elements in the or each extruded plastics body preferably extend helically assumed the axis of the body with a long length of lay.

By way of example, the improved elongate flexible core may have an overall diameter lying in the range 4 to 15 mm and the multiplicity of longitudinally stressed elongate flexible non-metallic reinforcing elements encapsulated in the or each extruded plastics body of the core preferably extend helically assumed the axis of the body with a lay length lying in the range 50 to 300 mm.

The longitudinally stressed, elongate flexible non-metallic reinforcing elements preferably are made of an aromtic polyamide such as that sold under the trade name "Kevlar"; alternative non-metallic materials of which they may be made include non-optical glass and carbon.

The plastics material in which the non-metallic reinforcing elements are encapsulated preferably is a thermoplastics material, such as polypropylene or nylon but, in some circumstances, it may be a thermosetting plastics material, such as a polyester or epoxy resin or polyurethane.

Other plastics materials in which the non-metallic reinforcing elements may be encapsulated are thermotropic liquid crystalline polymers such as wholly aromatic polyesters, aromatic-aliphatic polyesters, aromatic polyazomethines, aromatic polyester-carbonates and wholly or non-wholly aromatic polyester amides.

The or each elongate body of the improved elongate flexible core preferably is manufactured by a method which includes the steps of drawing a multiplicity of elongate flexible non-metallic reinforcing elements under tension through an extrusion die into which plastics material is being fed and which has on its internal surface a plurality of circumferentially spaced, longitudinally extending ribs and, downstream of the extrusion die, causing or permitting the plastics material to set. Where, as is preferred, the multiplicity of non-metallic reinforcing elements are to extend helically around the axis of the or each elongate body and the grooves are to extend helically around the core, preferably the body is twisted about its central axis downstream of the extrusion die and before the plastics material has set.

The invention is further illustrated by a description, by way of example, of three preferred forms of the improved elongate flexible core and of a preferred form of aerial optical cable with reference to the accompanying drawings, in which.

Figure 1:
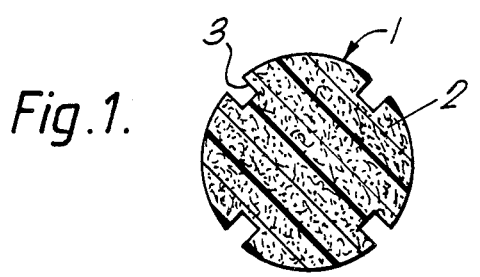
FIG. 1 is a transverse cross-sectional view, drawn on an enlarged scale, of a first preferred form of elongate flexible core.

Referring to the drawings, the first preferred form of elongate flexible core 1 shown in FIG. 1 comprises a single elongate body 2 which comprises extruded thermoplastics material and a multiplicity of longitudinally stressed elongate flexible reinforcing elements of an aromatic polyamide which extends helically around the axis of the body with a long length of lay and each of which is substantially encapsulated in the extruded plastics material. The multiplicity of reinforcing elements is substantially evenly distributed throughout the cross-sectional area of the body, the proportion of reinforcing elements in the extruded thermoplastics material lying in the range 60–70% by volume. The core 1 has in its outer circumferential surface four circumferentially spaced helically extending separate grooves 3 for loosely housing separate optical fibres.

Figure 2:
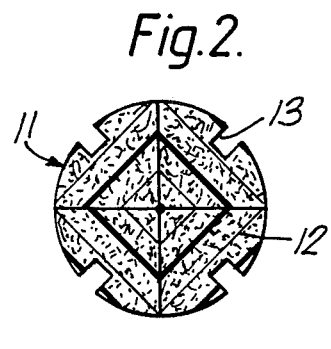
FIG. 2 is a transverse cross-sectional view, drawn on an enlarged scale, of a second preferred form of elongate flexible core.

The second preferred form of elongate flexible core 11 shown in FIG. 2 comprises four elongate flexible bodies 12, which extend helically around the axis of the core each elongate body having of a cross-section approximating to a sector of a circle and each elongate body having in its outer arcuate surface a longitudinally extending groove 13 for loosely housing at least one separate optical fibre. Each elongate body 12 comprises extruded thermoplastics material and a multiplicity of longitudinally stressed elongate flexible reinforcing elements of an aromatic polyamide which extend helically around the axis of the body with a long length of lay and each of which is substantially encapsulated in the extruded thermoplastics material. The multiplicity of reinforcing elements is substantially evenly distributed throughout the cross-sectional area of the body 12, the proportion of reinforcing elements in the extruded thermoplastics material lying in the range 60–70% by volume.

Figure 3:
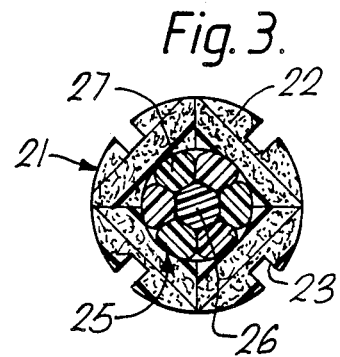
FIG. 3 is a transverse cross-sectional view, drawn on an enlarged scale, of a third preferred form of elongate flexible core.

The third preferred form of elongate flexible core 21 shown in FIG. 3 comprises a central stranded member 25 consisting of a central elongate flexible body 26 and six elongate flexible bodies 27 which extend helically around the flexible body 26. A plurality of elongate flexible bodies 22 extend helically around the central stranded memory 25 in the opposite direction of lay to that of the flexible bodies 27, each body 22 having a cross-section approximating to a sector of an annulus in the outer arcuate surface of which is a longitudinally extending groove 23 for loosely housing at least one separte optical fibre. Each of the elongate flexible bodies 22, 26 and 27 comprises extruded thermoplastics material and a multiplicity of longitudinally stressed elongate flexible reinforcing elements of an aromatic polyamide which extend helically around the axis of the body with a long length of lay and each of which is substantially encapsulated in the extruded thermoplastics material. The multiplicity of reinforcing elements is substantially evenly distributed throughout the cross-sectional area of the body, the proportion of reinforcing elements in the extruded thermoplastics material lying in the range 60–70% by volume. The elongate flexible bodies 26 and 27 of the central stranded member 25 are so deformed and compacted together that the central stranded member has a transverse cross-sectional shape of approximately hexagonal form and that any tendency for the flexible bodies to spring transversely apart is substantially eliminated.

Figure 4:
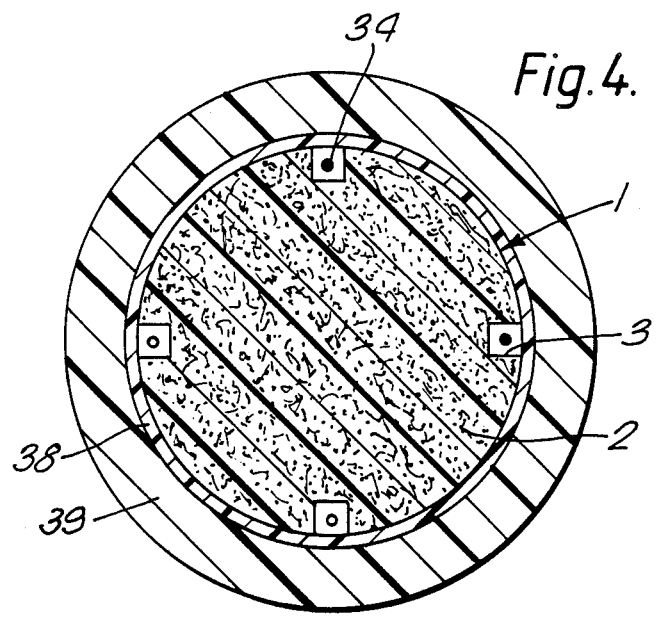
FIG. 4 is a transverse cross-sectional view, drawn on a greatly enlarged scale, of the preferred form of aerial optical cable.

The preferred aerial optical cable shown in FIG. 4 comprises an elongate flexible core 1, as described with reference to FIG. 1; a composite layer 38 of paper or plastics material which surrounds the core and closes the grooves 3 and which consists of an inner longitudinally applied, transversely folded tape and an outer tape helically wound around the transversely folded inner tape; and, surrounding the composite layer 38 of paper or plastics material, an extruded sheath 39 of plastics material which may have anti-tracking properties. An optical fibre 34 is loosely housed in each groove 3.

The elongate flexible core so renders the optical cable suitable for use as an aerial cable that the incorporation of circumferentialy spaced reinforcing elements within the outer sheath 39 is unnecessary.

What we claim as our invention is:

1. An elongate flexible core for use in an optical cable, which core has in its outer circumferential surface a plurality of circumferentially spaced, longitudinally extending separate grooves, wherein the core comprises extruded plastics material and a multiplicity of longitudinally stressed elongate flexible non-metallic reinforcing elements each substantially encapsulated in said extruded plastics material, the multiplicity of non-metallic reinforcing elements being substantially evenly distributed throughout the cross-sectional area of the core.

2. An elongate flexible core for use in an optical cable, which core has in its outer circumferential surface a plurality of circumferentially spaced, longitudinally extending separate grooves, wherein the core comprises a plurality of elongate flexible bodies extending helically around the axis of the core, each of which bodies comprises extruded plastics material and a multiplicity of longitudinally stressed elongate flexible non-metallic reinforcing elements each substantially encapsulated in said extruded plastics material, the multiplicity of non-metallic reinforcing elements being substantially evenly distributed throughout the cross-sectional area of the body.

3. An elongate flexible core as claimed in claim 2, whereineach elongate body has a cross-section approximating to a sector of a circle and each elongate body has in its outer arcuate surface at least on longitudinally extending groove.

4. An elongate flexible core for use in an optical cable, which core has in its outer circumferential surface a plurality of circumferentially spaced, longitudinally extending separate grooves, wherein the core comprises a central stranded member comprising a plurality of elongate flexible bodies which extend helically around the axis of the core and, extending helically around the central stranded member, a plurality of elongate flexible bodies, each of which flexible bodies has a cross-section approximating to a sector of an annulus in the outer arcuate surface of which is at least one longitudinally extending groove and comprises extruded plastics material and a multiplicity of longitudinally stressed elongate flexible non-metallic reinforcing elements each substantially encapsulated in said extruded plastics material, the multiplicity of non-metallic reinforcing elements being substantially evenly distributed throughout the cross-sectional area of the body.

5. An elongate flexible core as claimed in claim 4, wherein the elongate flexible bodies of the central stranded member are so deformed and compacted together that any tendency for the flexible bodies to spring transversely apart is substantially eliminated.

6. An elongate flexible core as claimed in claim 1, wherein at any position along the length of the elongate flexible core the proportion of non-metallic reinforcing elements in the extruded plastics material lies in the range 60 to 70% by volume.

7. An elongate flexible core as claimed in claim 1, wherein the non-metallic reinforcing elements extend helically within the extruded plastics body with a long length of lay.

8. An elongate flexible core as claimed in claim 1, wherein the core has an overall diameter lying in the range 4 to 15 mm and the multiplicity of longitudinally stressed elongate flexible non-metallic reinforcing elements extend helically within the extruded plastics body with a lay length lying in the range 50 to 300 mm.

9. An elongate flexible core as claimed in claim 1, wherein the longitudinally stressed, elongate flexible non-metallic reinforcing elements of said composition are made of an aromatic polyamide.

10. An elongate flexible core as claimed in claim 1, wherein the plastics material is a thermoplastics material.

11. An elongate flexible core as claimed in claim 1, wherein the plastics material is a thermosetting plastics material.

12. An elongate flexible core as claimed in claim 1, wherein the plastics material is thermotropic liquid crystalline polymer.

13. An optical cable comprising an elongate flexible core as claimed in claim 1, at least one optical fibre loosely housed in at least one of the circumferentially spaced, longitudinally extending separate grooves of the core and, surrounding the core, an outer protective sheath.

* * * * *